(12) United States Patent
Yamaguchi

(10) Patent No.: US 8,973,737 B2
(45) Date of Patent: Mar. 10, 2015

(54) CONVEYING APPARATUS

(71) Applicant: Kabushiki Kaisha Toyota Jidoshokki, Kariya-shi, Aichi-ken (JP)

(72) Inventor: Kazuyuki Yamaguchi, Aichi-ken (JP)

(73) Assignee: Kabushiki Kaisha Toyota Jidoshokki, Aichi-ken (JP)

(*) Notice: Subject to any disclaimer, the term of this patent is extended or adjusted under 35 U.S.C. 154(b) by 0 days.

(21) Appl. No.: 14/224,715

(22) Filed: Mar. 25, 2014

(65) Prior Publication Data

US 2014/0291120 A1 Oct. 2, 2014

(30) Foreign Application Priority Data

Mar. 29, 2013 (JP) ................................. 2013-071006

(51) Int. Cl.
| | |
|---|---|
| *B65G 17/22* | (2006.01) |
| *B65G 17/34* | (2006.01) |
| *B65G 17/42* | (2006.01) |
| *B65G 17/00* | (2006.01) |

(52) U.S. Cl.
CPC .............. *B65G 17/005* (2013.01); *B65G 17/22* (2013.01); *B65G 17/34* (2013.01); *B65G 17/42* (2013.01)
USPC .......................... 198/474.1; 198/793; 198/850

(58) Field of Classification Search
CPC ...... B65G 17/22; B65G 17/005; B65G 17/44; B65G 17/34
USPC ................................ 198/474.1, 793, 850, 851
See application file for complete search history.

(56) References Cited

U.S. PATENT DOCUMENTS

| | | | | | |
|---|---|---|---|---|---|
| 1,928,934 | A | * | 10/1933 | Green ........................ | 198/377.02 |
| 2,181,659 | A | * | 11/1939 | Johnson ......................... | 198/851 |
| 3,019,888 | A | * | 2/1962 | Johnston ........................ | 198/793 |
| 3,877,567 | A | * | 4/1975 | Sommerfield ................ | 198/833 |
| 2004/0206607 | A1 | * | 10/2004 | Kawasaki ..................... | 198/831 |
| 2006/0151300 | A1 | * | 7/2006 | Blasi ............................ | 198/793 |

FOREIGN PATENT DOCUMENTS

| | | | | |
|---|---|---|---|---|
| EP | 2060959 A2 | * | 5/2009 | ............ B65G 17/48 |
| FR | 1166494 A | | 11/1958 | |
| FR | 2561218 A1 | * | 9/1985 | ............ B65G 17/48 |
| JP | 53-33985 U | | 8/1978 | |
| JP | 2000246416 A | | 9/2000 | |
| JP | 2007-314311 A | | 12/2007 | |

OTHER PUBLICATIONS

Communication dated Jul. 21, 2014 from the European Patent Office in counterpart European Patent Application No. 14153917.1.

* cited by examiner

*Primary Examiner* — Mark A Deuble
(74) *Attorney, Agent, or Firm* — Sughrue Mion, PLLC

(57) ABSTRACT

A conveying apparatus includes a frame, a conveying path, a curved path, an endless traction element, a plurality of conveying tables and a table guide. The conveying path is formed in the frame so as to circulate by the curved path at which the conveying direction of the conveying path is changed. The endless traction element is disposed along the conveying path in a freely traveling manner and includes a plurality of connecting pins disposed at a predetermined interval. The conveying table has a cylindrical shape and a hole formed through the conveying table at a position eccentric from the center of the conveying table in which the connecting pin is inserted. The conveying tables are rotatably connected to the endless traction element by the connecting pins. The table guide is configured to guide the conveying table traveling on the curved path to move outwardly.

10 Claims, 4 Drawing Sheets

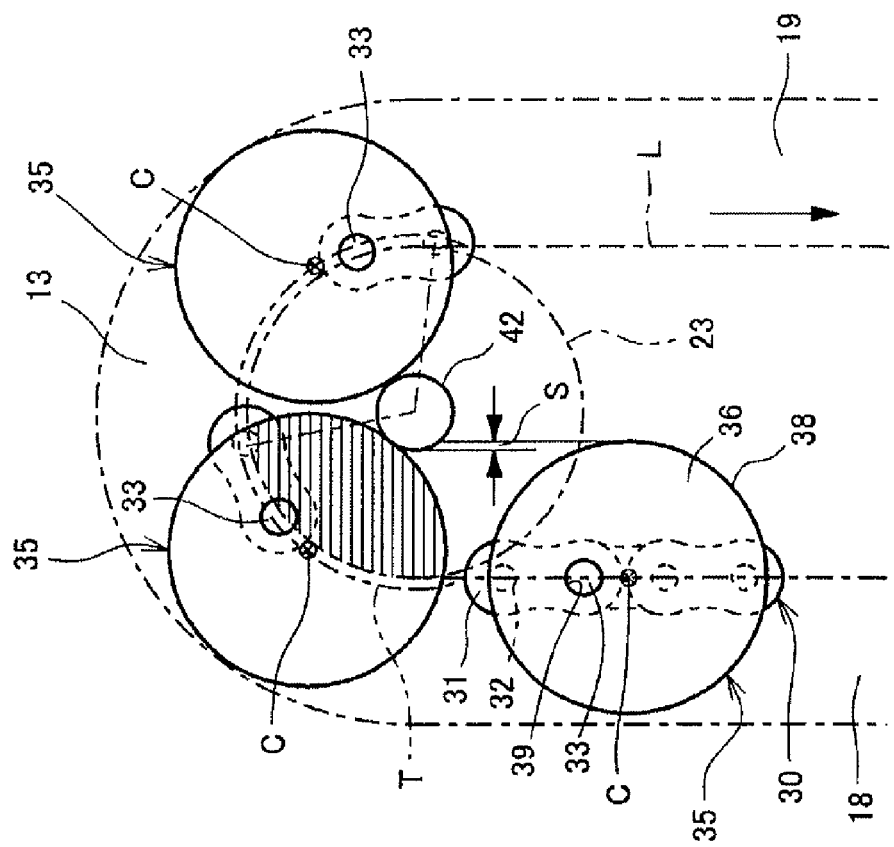
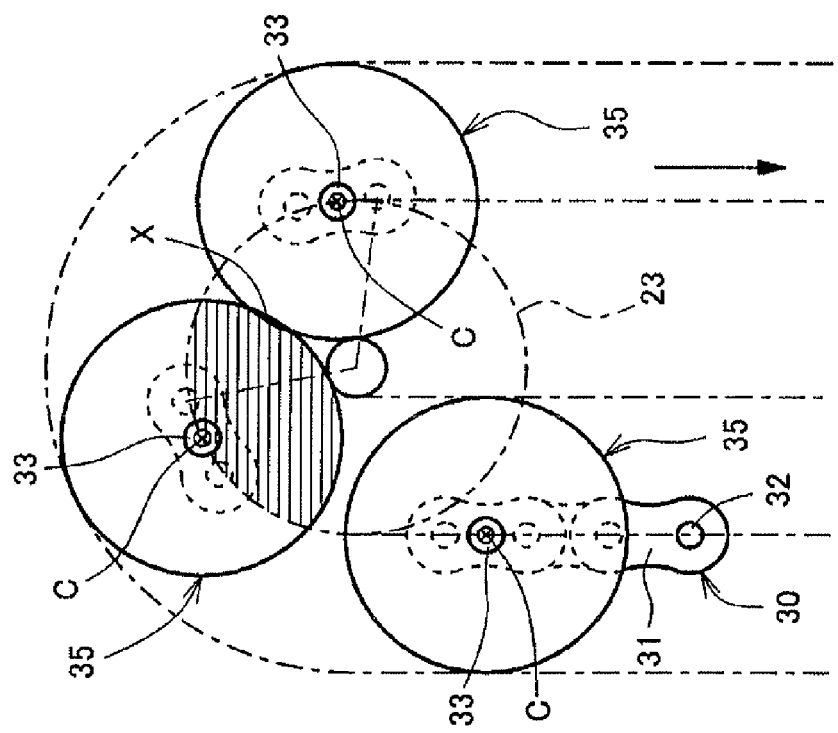

US 8,973,737 B2

CONVEYING APPARATUS

BACKGROUND OF THE INVENTION

The present invention relates generally to a conveying apparatus, and more particularly to a conveying apparatus including an endless traction element.

A conveying apparatus is disclosed in Japanese Patent Application Publication No. 2007-314311. The conveying apparatus disclosed in the Publication includes a rotatable sprocket and a chain wound around the sprocket so as to move in an endless path and having a plurality of jigs on which work pieces are placed at predetermined intervals. In the conveying apparatus, if the diameter of the sprocket is reduced, interference occurs between any two adjacent jigs. Thus, the diameter of the sprocket is restricted by the size of the jig.

In order to solve this problem, a conveying apparatus having a chain with a reduced turning radius is disclosed in Japanese Examined Utility Model Publication No. 53-33985. In the conveying apparatus disclosed in this Publication, a chain is engaged with a chain wheel which is fixedly mounted on a shaft which is in turn rotatably supported by a bearing support. A plurality of guide cylinders is fixedly mounted to the chain through attachments at an equidistant interval or at an integral multiple interval and a support bar is vertically slidably inserted through each of the guide cylinder. Each support bar is fixedly mounted to a plate at the bottom and a roller is rotatably mounted to the support bar at the bottom thereof. A guide rail is fixedly mounted to the frame of the conveying apparatus. The guide rail extends curved vertically upward or downward from the starting point of the engagement between the chain and the chain wheel along the circumference of the chain wheel. Thus, the rollers travel on the guide rail with the movement of the chain.

According to the conveying apparatus disclosed in the Publication No. 53-33985, the rollers travel on the guide rail with the movement of the chain. Accordingly, the support bars and plates move upward and downward on the guide rail along the circumference of the chain wheel. When the chain is driven to move around the chain wheel, any two adjacent plates moving around the chain wheel overlap with each other as seen from the top of the plates. Because such two adjacent plates are positioned one above the other while moving around the chain wheel, no contact interference occurs between the plates.

In the conveying apparatus disclosed in the Publication No. 53-33985, even if the turning radius of the plate-shaped conveying table is reduced, the adjacent conveying tables moving around the chain wheel may be prevented from interfering with each other at the curved path of the conveying path. However, the conveying apparatus that allows the conveying tables to move vertically upward and downward becomes complicated in structure and requires a space allowing the vertical movement of the conveying tables. In addition, since a part of the upper conveying table overlaps the lower conveying table as seen from the top, there is a fear that an article placed on one table may interfere with an article on another conveying table.

The present invention is directed to providing a conveying apparatus which prevents any two adjacent conveying tables moving on a curved path from interfering with each other without positioning one table above or below its adjacent table when moving on the curved path, even if the turning radius of the curved path is reduced.

SUMMARY OF THE INVENTION

In accordance with the present invention, a conveying apparatus includes a frame, a conveying path, a curved path, an endless traction element, a plurality of conveying tables and a table guide. The conveying path is formed in the frame so as to circulate. The curved path is formed in the conveying path and a conveying direction of the conveying path is changed at the curved path. The endless traction element is disposed along the conveying path in a freely traveling manner and includes a plurality of connecting pins disposed at a predetermined interval. A plurality of conveying tables has a cylindrical shape and a hole formed through the conveying table at a position eccentric from the center of the conveying table in which the connecting pin is inserted. The conveying tables are rotatably connected to the endless traction element by the connecting pins. The table guide is configured to guide the conveying table traveling on the curved path to move outside of the curved path.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which:

FIG. 4A is a partially enlarged plan view showing the operation of the conveying apparatus of FIG. 1; and FIG. 4B is a partially enlarged plan view showing the operation of a conveying apparatus according to a comparative example.

DETAILED DESCRIPTION OF THE PREFERRED EMBODIMENT

The following will describe a conveying apparatus according to a preferred embodiment with reference to FIGS. 1 through 4B. This preferred embodiment will be described as applied to a conveying apparatus used for continuously conveying cylindrical work pieces as an object to be conveyed.

Figure 1:
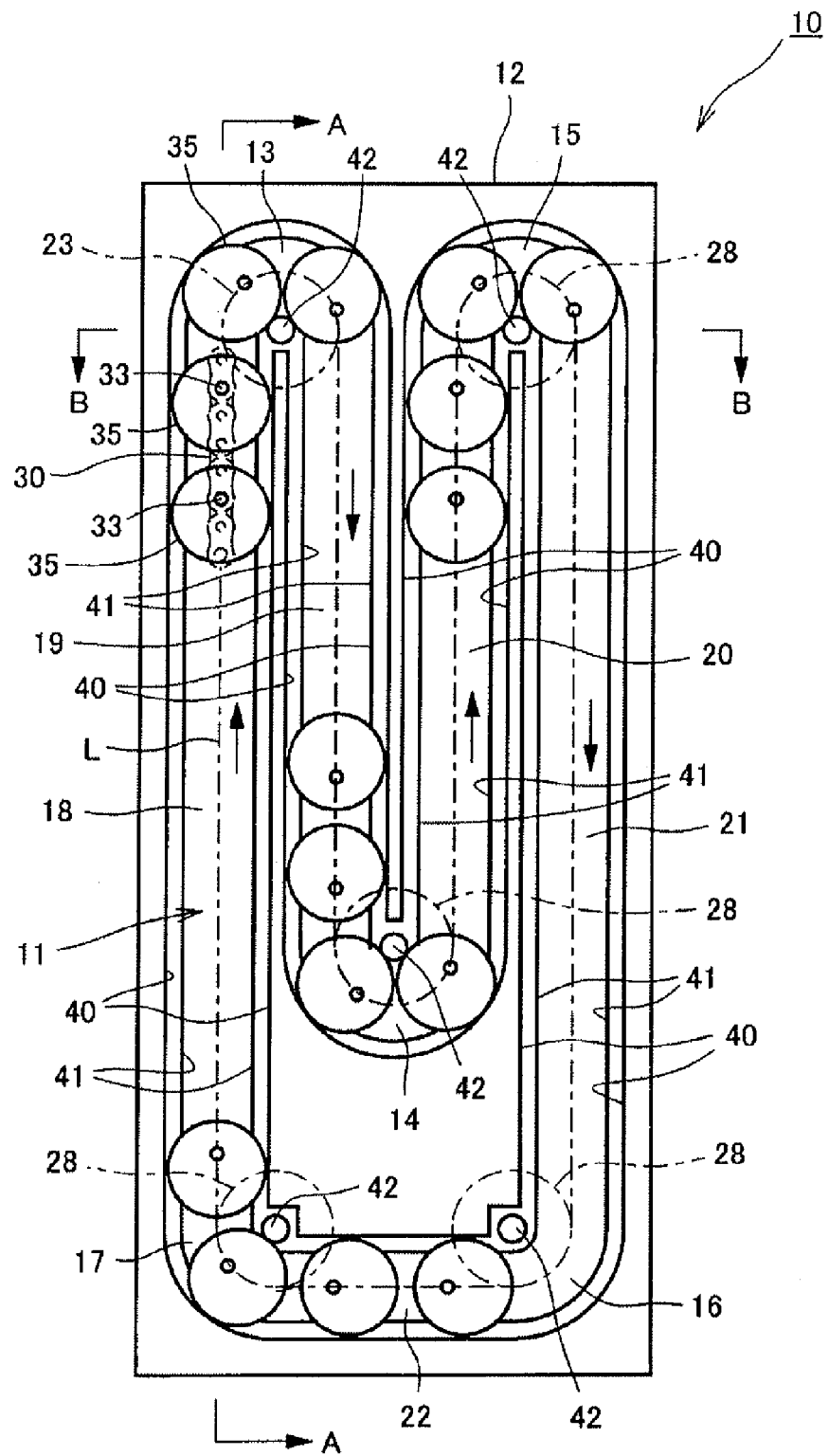
FIG. 1 is a plan view showing a conveying apparatus according to a preferred embodiment of the present invention.

Referring to FIG. 1, reference numeral 10 generally designates a conveying apparatus including a frame 12 in which a circulating conveying path 11 is formed. As shown in FIG. 1, the conveying path 11 is formed by a plurality of curved paths where the conveying direction is changed and a plurality of linear paths where the conveying direction is straight and constant. The curved paths include a first reversing path 13, a second reversing path 14 and a third reversing path 15 where the conveying direction is turned by 180 degrees and further a first right-angle path 16 and a second right-angle path 17 where the conveying direction is turned by 90 degrees. The linear paths includes a first linear path 18 extending between the second right-angle path 17 and the first reversing path 13, a second linear path 19 extending between the first and the second reversing paths 13, 14, a third linear path 20 extending between the second and the third reversing paths 14, 15, a fourth linear path 21 extending between the third reversing path 15 and the first right-angle path 16 and a fifth linear path 22 extending between the first and the second right-angle paths 16, 17.

Figure 2:
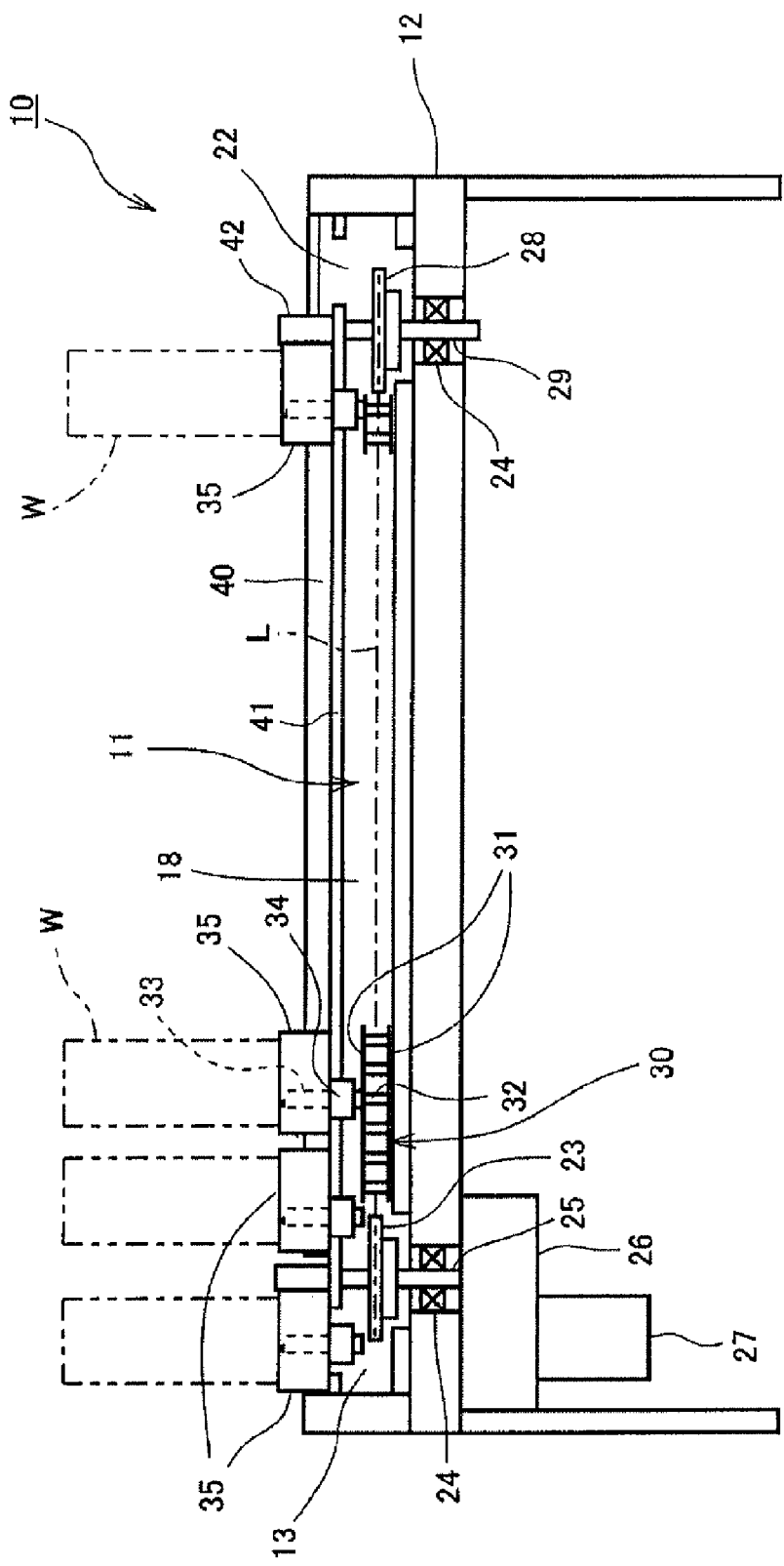
FIG. 2 is a cross-sectional view taken along the line A-A of FIG. 1.
Figure 3:
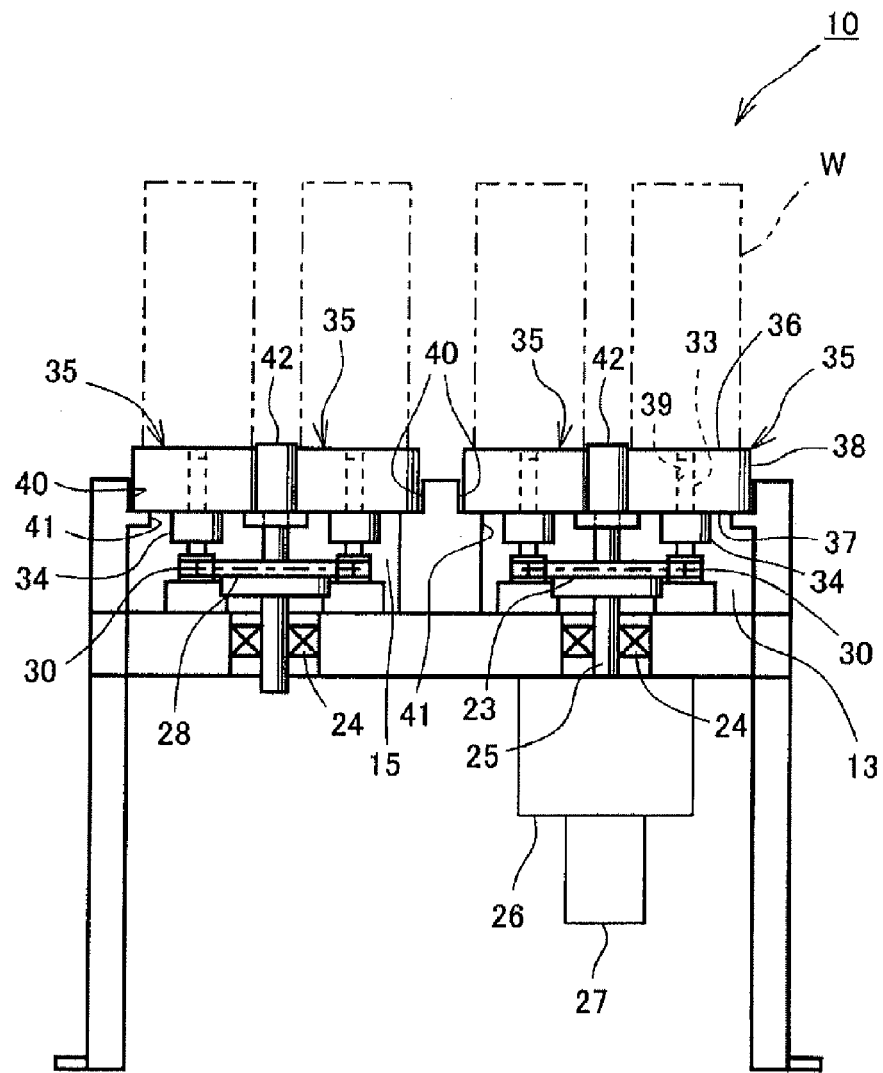
FIG. 3 is a cross-sectional view taken along the line B-B of FIG. 1.

Referring to FIGS. 2 and 3, a rotatable drive sprocket 23 is disposed at a position adjacent to the first reversing path 13. The drive sprocket 23 has a drive shaft 25 extending vertically downward and supported by a bearing 24 and is rotatable in a horizontal plane. The drive shaft 25 is connected at the bottom end thereof to a drive motor 27 through a reduction gear 26 mounted to the frame 12. Thus, the drive force of the drive motor 27 is transmitted to the drive sprocket 23 through the reduction gear 26 thereby to rotate the drive sprocket 23. The drive sprocket 23 serves as a sprocket of the present invention.

As shown in FIGS. 1, 2 and 3, driven sprockets 28 are provided at positions that are adjacent to the second reversing path 14, the third reversing path 15, the first right-angle path 16 and the second right-angle path 17, respectively. Each of the driven sprockets 28 has a driven shaft 29 extending vertically downward and supported by the bearing 24 and is rotatable in a horizontal plane. These driven sprockets 28 are rotatably mounted to the frame 12. The driven sprocket 28 serves as a sprocket of the present invention.

An endless chain 30 is wound around the drive sprocket 23 and the driven sprockets 28 in a freely traveling manner. The endless chain 30 serves as an endless traction element of the present invention. The endless chain 30 is of a known conventional type including a plurality of pairs of upper and lower link plates 31 and a plurality of pins 32 and supported by the frame 12 of the conveying apparatus 10. With the rotation of the drive sprocket 23, the endless chain 30 travels on the conveying path 11 in a circulating manner. As shown in FIG. 1, reference character L shows the centerline of the endless chain 30. A plurality of connecting pins 33 is disposed on the endless chain 30 at a predetermined interval. Each connecting pin 33 is disposed on the upper surface of the endless chain 30 in an upstanding position and fixed to a pin 32 of the endless chain 30 so as to be coaxial with the pin 32. A plurality of cylindrical support blocks 34 having a larger diameter than the connecting pin 33 is disposed adjacent to the bottom of the connecting pins 33. The connecting pin 33 is used for rotatably connecting a conveying table 35, which will be described later, to the endless chain 30 and the support block 34 is used for supporting the conveying table 35.

In this preferred embodiment, the aforementioned conveying tables 35 are connected to the endless chain 30 through the connecting pins 33, respectively. The conveying table 35 having a cylindrical shape includes an upper surface 36, a lower surface 37 and an outer peripheral surface 38. The upper surface 36 of the conveying table 35 serves as a mounting surface on which a work piece W is mounted. Forming the conveying table 35 in a cylindrical shape prevents the harmful interference of the conveying table 35 with the frame 12 of the conveying apparatus 10 while the conveying table 35 is traveling on the conveying path 11, thus allowing the conveying table 35 to travel smoothly on the conveying path 11. The work piece W to be conveyed by the conveying apparatus 10 of the preferred embodiment has a cylindrical shape and a diameter that is slightly smaller than that of the conveying table 35. The cylindrical shape of the conveying table 35 includes a disk shape.

A fall prevention member (not shown) is disposed on the upper surface 36 of the conveying table 35 for preventing the work piece W from falling from the upper surface 36. The conveying table 35 has a hole 39 formed therethrough at a position eccentric from the center thereof in which the connecting pin 33 is inserted. The hole 39 is formed through the upper and the lower surfaces 36, 37 and has a diameter slightly larger than that of the connecting pin 33. Thus, insertion and removal of the connecting pin 33 in and from the conveying table 35 is performed smoothly. In the state that the connecting pin 33 is inserted in the hole 39, the conveying table 35 is supported by the support block 34 with the connecting pin 33 loosely fitted in the hole 39. Thus, the conveying table 35 is rotatable about the connecting pin 33. According to such configuration of the conveying table 35, the center C of the conveying table 35 may move outside of the centerline L of the endless chain 30 with rotation of the conveying table 35.

The frame 12 of the conveying apparatus 10 has side walls 40 facing the outer peripheral surfaces 38 of the conveying tables 35. The side walls 40 are provided for the first through the fifth linear paths 18-22. The side walls 40 are provided in an arcuate form for the curved paths on the outside thereof. The side walls 40 have projections 41 extending from the side walls 40 and under the lower surfaces of the conveying tables 35.

The conveying apparatus 10 of the preferred embodiment further includes a guide pin 42 which is provided on the upper end of the drive shaft 25 of the drive sprocket 23 coaxially with the drive shaft 25. The guide pin 42 serves as a table guide of the present invention. The guide pin 42 guides the conveying table 35 in such a manner that the center C of the conveying table 35 traveling on the first reversing path 13 moves outside of the centerline L of the endless chain 30. Similar guide pins 42 are also provided on the upper ends of the driven shafts 29 of the driven sprockets 28 at the second and the third reversing paths 14, 15 and the first and the second right-angle paths 16, 17 in coaxial relation to the driven shafts 29, respectively. The guide pins 42 are disposed at the centers of the respective curved paths corresponding to the axes of the drive shaft 25 and the driven shafts 29.

The following will describe an operation of the conveying apparatus 10 according to the preferred embodiment. As the drive motor 27 is driven, the power of the drive motor 27 is transmitted to the sprocket 23 through the reduction gear 26 thereby to rotate the drive sprocket 23. As the endless chain 30 travels on the conveying path 11 in a circulating manner in accordance with the rotation of the drive sprocket 23, the conveying table 35 travels on the conveying path 11. In the case that a work piece W is placed on the conveying table 35, the work piece W is conveyed by the conveying table 35.

When the conveying table 35 travels on any of the first through the fifth linear paths 18-22, the center C of the conveying table 35 coincides with the centerline L of the endless chain 30. When the conveying table 35 travels on the curved paths including the first through the third reversing path 13-15 and the first and the second right-angle paths 16, 17, the center C of the conveying table 35 is offset from the centerline L of the endless chain 30. More specifically, when the conveying table 35 travels on these curves paths, the center C of the conveying table 35 moves outside of the centerline L of the endless chain 30.

FIG. 4A shows the traveling of the conveying table 35 on the first reversing path 13. As shown in the drawing, when the conveying table 35 is moving along the first linear path 18, the center C of the conveying table 35 coincides with the centerline L of the endless chain 30 and the conveying table 35 is positioned relative to the guide pin 42 such that the tangent to the outer peripheral surface of the guide pin 42 and extending perpendicularly to the centerline L of the endless chain 30 is offset outwardly by the distance S from the tangent to the outer peripheral surface 38 of the conveying table 35 and extending perpendicularly to the centerline L. In other words, the tangent to the guide pin 42 extending parallel to the centerline L does not coincide with the tangent to the conveying table 35 and is positioned closer to the centerline L than the tangent to the conveying table 35 by the distance S. Thus, the difference between the radii of the conveying table 35 and the guide pin 42 corresponds to the distance S, and the radius of the guide pin 42 is greater than the difference between the radii of the drive sprocket 23 and the conveying table 35. The conveying table 35 entering into the region of the first reversing path 13 from the first linear path 18 is guided by the guide pin 42 with the outer peripheral surface 38 of the conveying table 35 in contact with the guide pin 42 and while rotating around the connecting pin 33. Then, the center C of the conveying table 35 is positioned outward of the centerline L of the endless chain 30 by the distance S. The path T of the center C of the conveying table 35 on the first reversing path 13 extending outside of the drive sprocket 23 is indicated by the two-dot chain line in FIG. 4A. Thus, the area of the drive sprocket 23 covered by the conveying table 35 traveling on the first reversing path 13 as seen in plan view of the drive sprocket 23 and indicated by hatching in FIG. 4A may be reduced. Additionally, a space is formed between two adjacent conveying tables 35 turning around the first reversing path 13 and, therefore, such adjacent conveying tables 35 are prevented from contacting with each other.

FIG. 4B shows the operation of a conveying apparatus according to a comparative example. In the comparative example, the drive sprocket 23 and the endless chain 30 are the same as the preferred embodiment and also the conveying table 35 is the same as the counterpart components of the preferred embodiment except the mounting position of the connecting pin 33 to the conveying table 35. The interval at which the conveying tables 35 are mounted to the endless chain 30 of the comparative example is the same as that in the preferred embodiment. Thus, the same reference numerals and symbols will be used for the common elements or components in the present embodiment and the comparative example. Referring to FIG. 4B, the connecting pin 33 is positioned at the center of the link plate 31 of the endless chain 30 and inserted through the conveying table 35 at the center C of the conveying table 35. As shown in FIG. 4B, two adjacent conveying tables 35 turning around the first reversing path 13 overlap with each other at the area X as seen in plan view and, therefore, structure of FIG. 4 cannot operate appropriately as a conveying apparatus. As is apparent from comparison of FIGS. 4A and 4B, the area of the drive sprocket 23 which is covered by the conveying table 35 traveling on the first reversing path 13 as seen in plan view, indicated by hatching in FIG. 4B, is greater than that of the preferred embodiment. In order for the apparatus of FIG. 4B to operate appropriately as the conveying apparatus, the interval at which the conveying tables 35 are mounted to the endless chain 30 or the diameter of the drive sprocket 23 needs to be made greater. If the mounting interval of the conveying table 35 is made greater, the number of the work pieces per unit area is decreased and, if the diameter of the drive sprocket 23 is made greater, the installation area of the conveying apparatus is increased.

According to the present embodiment, through not shown in any of the drawings, the conveying table 35 is guided by the guide pin 42 to rotate around the guide pin 42 along the second and the third reversing paths 14, 15 in the same manner as the conveying table 35 is guided along the first reversing path 13. Thus, the center C of the conveying table 35 traveling on the second and the third reversing paths 14, 15 is positioned outside of the centerline L of the endless chain 30. Similarly, the conveying table 35 is guided by the guide pin 42 to rotate around the guide pin 42 along the first and the second right-angle paths 16, 17 in the same manner as the conveying table 35 is guided along the first reversing path 13 and the center C of the conveying table 35 traveling on the first and the second right-angle paths 16, 17 moves outside of the centerline L of the endless chain 30.

The conveying apparatus according to the preferred embodiment offers the following advantageous effects.

(1) When the conveying table 35 travels on the curved path, the conveying table 35 is guided by the guide pin 42 to turn around the guide pin 42 while rotating about the connecting pin 33. Since the connecting pin 33 is inserted through the conveying table 35 at a position eccentric from the center C of the conveying table 35, the center C of the conveying table 35 is moved along a line that is outward of the centerline L of the endless chain 30. Accordingly, a space is formed between any two adjacent conveying tables 35 moving on the curved paths, thereby preventing such conveying tables 35 from interfering with each other. If the turning radius of the curved path is made relatively small, therefore, the adjacent conveying tables 35 are prevented from interfering with each other without arranging the conveying tables 35 moving along the curved path one above the other.

(2) The turning radius of the curved path formed of the endless chain 30 may set smaller than a conventional one.

(3) The distances between the first and the second linear paths 18, 19, between the second and the third linear paths 19, 20 and between the third and the fourth linear paths 20, 21 may be set smaller than a conventional one. Accordingly, the frame 12 of the conveying apparatus 10 may be made smaller in width to reduce the installation space of the conveying apparatus 10. Accordingly, the number of the work pieces W per unit installation area of the conveying apparatus 10 may be increased.

(4) The conveying table 35 travels on the curved path with its center C positioned outward of the centerline L of the endless chain 30 by the guide pin 42 which has a relatively simple structure. The guide pin 42 serves as the table guide.

The present invention is not limited to the above-described embodiments, but may be variously modified within the scope of the invention, as exemplified below.

In the preferred embodiment, the endless chain is an example of the endless traction element. However, the endless traction element is not limited to the endless chain. Alternatively, an endless belt, such as a V-belt, a round belt or a flat belt, may be used as the endless traction element instead of the endless chain.

In the preferred embodiment, the guide pin is used as the table guide. However, the table guide is not limited to the guide pin. Alternatively, a guide member formed by bending a plate or bar may be used as the table guide. The guide member is formed to have a circular or arcuate guide surface and to be coaxial with the center of the curved path. Any table guide may be used as long as the table guide causes the conveying table to move outwardly.

In the preferred embodiment, the reversing path changing the conveying direction by 180 degrees and the right-angle path changing the conveying direction by 90 degrees are used as the curved path. Alternatively, only the reversing path may be used as the curved path. In addition, the changing degrees of the conveying direction by the curved path is not limited to 90 or 180 degrees. The curved path may be formed so as to change its conveying direction at different angles, for example, 90 or 180 degrees.

In the preferred embodiment, the conveying apparatus has five curved paths including one formed by drive sprocket and four formed by driven sprockets. The shape of the conveying path and the number of the driven sprockets are not limited.

For example, the conveying apparatus may have one drive sprocket and one driven sprocket so that two curved paths are formed.

In the preferred embodiment, the guide pins are connected to the drive shaft of the drive sprocket and the driven shafts of the driven sprockets, respectively. However, the connecting of the guide pins to the drive shaft and the driven shafts are not necessary. Alternatively, a bracket may be mounted to the frame of the apparatus and the guide pin may be mounted to the bracket without being connected to the drive and driven shafts. In this structure, the axes of the drive and the driven shafts should coincide with the axes of the guide pins, respectively. Alternatively, the guide pins may be connected to the drive and driven shafts so as to be rotatable with respect to the drive and the driven shafts.

In the preferred embodiment, the work piece has a cylindrical shape. However, the shape of the work piece is not limited. Alternatively, the work piece may have any shape as long as no part of the work piece extends out of the conveying table.

What is claimed is:

1. A conveying apparatus comprising:
   a frame;
   a conveying path formed in the frame so as to circulate;
   a curved path formed in the conveying path, a conveying direction of the conveying path is changed at the curved path;
   an endless traction element disposed along the conveying path in a freely traveling manner, the endless traction element including a plurality of connecting pins disposed at a predetermined interval;
   a plurality of conveying tables having a cylindrical shape and a hole formed through the conveying table at a position eccentric from the center of the conveying table in which the connecting pin is inserted, the conveying tables mounted to the endless traction element at a predetermined interval and rotatably connected to the endless traction element by the connecting pins; and
   a table guide configured to guide the conveying table traveling on the curved path to move outwardly.

2. The conveying apparatus according to claim 1, characterized in that the conveying apparatus further includes a sprocket rotatably mounted to the frame, the endless traction element is wound around the sprocket and the sprocket is coaxial with the center of the curved path.

3. The conveying apparatus according to claim 1, characterized in that the tangent to the outer peripheral surface of the table guide and extending perpendicularly to a centerline of the endless traction element is offset outwardly by a distance from the tangent to an outer peripheral surface of the conveying table and extending perpendicularly to the centerline.

4. The conveying apparatus according to claim 1, characterized in that the conveying table traveling on the curved path is guided by the table guide to turn around the table guide while the conveying table rotates about the connecting pin.

5. The conveying apparatus according to claim 4, characterized in that the table guide configured to guide the conveying table in such a manner that the center of the conveying table traveling on the curved path moves outside of the curved path.

6. The conveying apparatus according to claim 4, characterized in that the table guide configured to guide the conveying table in such a manner that the center of the conveying table traveling on the curved path moves outside of a centerline of the endless traction element.

7. The conveying apparatus according to claim 1, characterized in that the endless traction element is an endless chain.

8. The conveying apparatus according to claim 1, characterized in that the curved path includes a reversing path where the conveying direction is turned by 180 degrees.

9. The conveying apparatus according to claim 1, characterized in that the curved path includes a right-angle path where the conveying direction is turned by 90 degrees.

10. The conveying apparatus according to claim 1, characterized in that the table guide is a guide pin disposed at the center of the curved path.

\* \* \* \* \*